US010338921B2

(12) United States Patent
Yang et al.

(10) Patent No.: US 10,338,921 B2
(45) Date of Patent: Jul. 2, 2019

(54) ASYNCHRONOUS INSTRUCTION EXECUTION APPARATUS WITH EXECUTION MODULES INVOKING EXTERNAL CALCULATION RESOURCES

(71) Applicant: Huawei Technologies Co., Ltd., Shenzhen (CN)

(72) Inventors: Shaola Yang, Hangzhou (CN); Xiaocheng Liu, Hangzhou (CN); Zhen Xu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 105 days.

(21) Appl. No.: 15/482,550

(22) Filed: Apr. 7, 2017

(65) Prior Publication Data
US 2017/0212759 A1 Jul. 27, 2017

Related U.S. Application Data (63) Continuation of application No. PCT/CN2014/088179, filed on Oct. 9, 2014.

(51) Int. Cl.
*G06F 9/30* (2018.01)
*G06F 9/38* (2018.01)
(Continued)

(52) U.S. Cl.
CPC ........ *G06F 9/30036* (2013.01); *G06F 9/3001* (2013.01); *G06F 9/30145* (2013.01);
(Continued)

(58) Field of Classification Search
CPC ....... G06F 15/82; G06F 15/825; G06F 9/3871
See application file for complete search history.

(56) References Cited

U.S. PATENT DOCUMENTS 5,794,059 A 8/1998 Barker et al.
7,334,110 B1 2/2008 Faanes et al.
(Continued)

FOREIGN PATENT DOCUMENTS

| CN | 101371233 A | 2/2009 |
|---|---|---|
| CN | 1656445 B | 5/2010 |
| WO | 03038602 A2 | 5/2003 |

OTHER PUBLICATIONS

Michel Laurence, Low-Power High-Performance Asynchronous General Purpose ARMv7 Processor for Multi-Core Applications, Jul. 2013, 52 pages, [retrieved from the internet on Nov. 6, 2018], retrieved from URL <www.mpsoc-forum.org/previous/2013/slides/7-Laurence.pdf>.*

*Primary Examiner* — Jyoti Mehta
(74) *Attorney, Agent, or Firm* — Leydig, Voit & Mayer, Ltd.

(57) ABSTRACT

An asynchronous instruction execution apparatus and method are provided. The asynchronous instruction execution apparatus includes a vector execution unit control VXUC module and n vector execution unit data VXUD modules, where n is a positive integer. The VXUC module is configured to perform instruction decoding and token management. The n VXUD modules are cascaded, separately connected to the VXUC module, and configured to invoke an external calculation resource to perform data calculation. A bit width of data processed by the asynchronous instruction execution apparatus is M, a bit width of each VXUD module is N, and n=M/N. The asynchronous instruction execution apparatus is divided into two parts: the VXUC and the VXUD.

19 Claims, 6 Drawing Sheets

(51) Int. Cl.
*G06F 9/46* (2006.01)
*G06F 15/80* (2006.01)

(52) U.S. Cl.
CPC .......... *G06F 9/3836* (2013.01); *G06F 9/3871* (2013.01); *G06F 9/3885* (2013.01); *G06F 9/46* (2013.01); *G06F 15/8092* (2013.01)

(56) References Cited

U.S. PATENT DOCUMENTS

| | | | |
|---|---|---|---|
| 2003/0131270 A1* | 7/2003 | Abernathy | G06F 1/3203 713/322 |
| 2005/0240729 A1 | 10/2005 | Van Berkel et al. | |
| 2006/0176309 A1 | 8/2006 | Gadre et al. | |
| 2014/0064096 A1 | 3/2014 | Stevens et al. | |
| 2015/0127925 A1* | 5/2015 | Follett | G06F 15/82 712/30 |

* cited by examiner

ASYNCHRONOUS INSTRUCTION EXECUTION APPARATUS WITH EXECUTION MODULES INVOKING EXTERNAL CALCULATION RESOURCES

CROSS-REFERENCE TO RELATED APPLICATIONS

This application is a continuation of the International Application No. PCT/CN2014/088179, filed on Oct. 9, 2014, the disclosure of which is hereby incorporated by reference in its entirety.

TECHNICAL FIELD

Embodiments of the present invention relate to the processor field, and more specifically, to an asynchronous instruction execution apparatus and method.

BACKGROUND

A current processor, such as a central processing unit (CPU, Central Processor Unit), performs an operation mainly in a pipeline manner, and this is a key technology for accelerating the CPU. Both a synchronous processor and an asynchronous processor usually use this pipeline technology. In the synchronous processor, each operation in the pipeline is controlled by a same clock, and this architecture causes relatively high CPU consumption. Based on the pipeline, in the asynchronous processor, a pulse used in each operation (that is, a clock of the operation) is not synchronous, and whether the pulse needs to be given in the operation is determined according to a current instruction, so as to reduce consumption.

Currently, a mainstream asynchronous processor circuit is relatively complex, and includes control logic and a data path. The control logic includes a handshake protocol and a control component. In a latest asynchronous processor circuit design, a token (token) method is used to replace the handshake protocol, and this may reduce design complexity. The idea of tokens is similar to relay transfer. When receiving a token signal, a function module starts execution, and passes the token to a next function module when execution ends. When execution of the next function module is not required, the token is directly transparently transmitted to a subsequent module. In this asynchronous processor, a token is a clock signal, and each module samples a data signal by using a token signal.

In a typical asynchronous processor that uses a token, a clock signal passes through a delay logic unit, and is input into each function unit to sample a corresponding data signal. The function unit includes a sampling unit (clocked device) and processing logic (Processing Logic). The delay logic unit is an important part of the asynchronous processor, and is also an important component for distinguishing the asynchronous processor from the synchronous processor. The delay logic unit controls a token use time and token transfer. After receiving a token, a unit completes execution, and passes the token along, and this period of time is the token use time. The token transfer includes transfer between execution units and transfer between function units. If an asynchronous processor includes M execution units (XU, Execution Unit), and each XU includes N function units, M tokens are transferred between XUs (referred to as vertical token transfer in the following), and N tokens are transferred between function units in each XU (referred to as horizontal token transfer in the following). Therefore, a total quantity of tokens is N×M. When a token is out of use, the token may be transferred to a next function unit and a next XU at the same time.

Therefore, for the asynchronous processor that uses a token, a main architecture of the asynchronous processor includes an XU and token logic, and token transfer controls an execution procedure of the XU.

In the current token-based asynchronous processor architecture, each XU represents an arithmetic logic unit (ALU, Arithmetic Logic Unit). The architecture may further include a register (REG, Register), a multiply accumulate (MAC, Multiply Accumulate) unit, and an external execution unit (EXU, External Execution Unit). The MAC unit performs an operation such as multiplication, and the EXU performs an operation such as division or a floating-point operation. In the processor architecture, the token logic controls an execution sequence of units, n XUs need n ALUs, and each ALU has m function units, so that n×m tokens need to be transferred. For these tokens, a clock pulse (clock pulse) signal is generated according to information obtained after instruction decoding, to invoke each function unit.

This token-based asynchronous processor architecture is not flexible enough, and a quantity of ALUs and a quantity of vertical tokens need to remain consistent. With an increasing bit width of data that needs to be processed by a future processor, a quantity of XUs also needs to be increased, and a bus width is large. This is unfavorable to a backend layout.

SUMMARY

Embodiments of the present invention provide an asynchronous instruction execution apparatus and method, so as to facilitate a backend layout of an asynchronous processor.

According to a first aspect, an asynchronous instruction execution apparatus is provided, including a vector execution unit control VXUC module and n vector execution unit data VXUD modules, where n is a positive integer, the VXUC module is configured to perform instruction decoding and token management, the n VXUD modules are cascaded, separately connected to the VXUC module, and configured to invoke an external calculation resource to perform data calculation, a bit width of data processed by the asynchronous instruction execution apparatus is M, a bit width of each VXUD module is N, and n=M/N.

With reference to the first aspect, in an implementation manner of the first aspect, the VXUC module includes a decoding submodule and a token management submodule, where the decoding submodule is configured to decode an instruction from a vector instruction fetcher VIF, to obtain decoded instruction information, and the token management submodule is configured to manage, according to the decoded instruction information obtained by the decoding submodule, token transfer between the asynchronous instruction execution apparatus and another asynchronous instruction execution apparatus and token transfer inside the asynchronous instruction execution apparatus.

With reference to the first aspect and the foregoing implementation manner of the first aspect, in another implementation manner of the first aspect, the token management submodule is further configured to: when the decoded instruction information obtained by the decoding submodule indicates that the external calculation resource needs to be invoked, generate a clock pulse signal corresponding to the external calculation resource, and send control information included in the decoded instruction information and the clock pulse signal to the VXUD module; and the VXUD module including a resource interface connected to the external calculation resource is configured to send the clock pulse signal and the control information to the external calculation resource by using the resource interface, to enable the external calculation resource to perform data calculation according to the clock pulse signal and the control information, and is configured to receive, by using the resource interface, a data calculation result from the external calculation resource.

With reference to the first aspect and the foregoing implementation manners of the first aspect, in another implementation manner of the first aspect, the control information includes configuration flag information, and the VXUD module is specifically configured to send the configuration flag information to the external calculation resource by using the resource interface, so that the external calculation resource is configured according to the configuration flag information and then performs the data calculation.

With reference to the first aspect and the foregoing implementation manners of the first aspect, in another implementation manner of the first aspect, the VXUD module is further configured to receive an immediate obtained after the VIF initially decodes the instruction, and send the immediate to the external calculation resource by using the resource interface, so that the external calculation resource uses the immediate to perform the data calculation; or the VXUD module is further configured to receive register address information obtained after the VIF initially decodes the instruction, read register data from a register according to the register address information, and send the register data to the external calculation resource by using the resource interface, so that the external calculation resource uses the register data to perform the data calculation.

With reference to the first aspect and the foregoing implementation manner of the first aspect, in another implementation manner of the first aspect, the VXUD module further includes a read/write interface connected to the register.

With reference to the first aspect and the foregoing implementation manner of the first aspect, in another implementation manner of the first aspect, the VXUD module is further configured to receive register read/write token information obtained after the VIF initially decodes the instruction, and perform a read/write operation on the register according to the register read/write token information by using the read/write interface; and the token management submodule is further configured to receive the register read/write token information obtained after the VIF initially decodes the instruction, and manage transfer of a read/write token of the register according to the register read/write token information.

With reference to the first aspect and the foregoing implementation manner of the first aspect, in another implementation manner of the first aspect, the VXUD module further includes a communications interface and an execution submodule; the VXUD module is configured to exchange, with another VXUD module by using the communications interface, information about the data calculation result of the external calculation resource; and the execution submodule is configured to perform a shift operation and/or a selection operation according to the data calculation result received by the VXUD module and the information that is about the data calculation result and obtained from the another VXUD module.

With reference to the first aspect and the foregoing implementation manner of the first aspect, in another implementation manner of the first aspect, the VXUD module is further configured to receive delay information obtained after the VIF initially decodes the instruction, and control a sampling delay of the external calculation resource according to the delay information.

With reference to the first aspect and the foregoing implementation manner of the first aspect, in another implementation manner of the first aspect, the VXUC module is further configured to receive instruction anomaly information obtained after the VIF initially decodes the instruction; and the token management submodule is further configured to manage token transfer according to the instruction anomaly information.

With reference to the first aspect and the foregoing implementation manners of the first aspect, in another implementation manner of the first aspect, the token management submodule is specifically configured to: when multiple pieces of decoded instruction information indicate that a same external calculation resource needs to be invoked, sequentially generate clock pulse signals for the multiple pieces of decoded instruction information, and send the generated clock pulse signals to the VXUD module in a sequential order; or the token management submodule is specifically configured to: when one piece of decoded instruction information indicates that multiple external calculation resources need to be invoked, sequentially generate clock pulse signals for the multiple external calculation resources, and sequentially send the generated clock pulse signals to the VXUD module according to an order of invoking the multiple external calculation resources.

According to a second aspect, a terminal is provided, including the foregoing asynchronous instruction execution apparatus.

According to a third aspect, an asynchronous instruction execution method is provided, where the method is executed by an asynchronous instruction execution apparatus, the asynchronous instruction execution apparatus includes a vector execution unit control VXUC module and n vector execution unit data VXUD modules, n is a positive integer, the n VXUD modules are cascaded and separately connected to the VXUC module, a bit width of data processed by the asynchronous instruction execution apparatus is M, a bit width of each VXUD module is N, n=M/N, and the method includes: decoding, by the VXUC module, an instruction from a vector instruction fetcher VIF, to obtain decoded instruction information; managing, by the VXUC module according to the decoded instruction information obtained by the decoding submodule, token transfer between the asynchronous instruction execution apparatus and another asynchronous instruction execution apparatus and token transfer inside the asynchronous instruction execution apparatus; when the decoded instruction information obtained by the decoding submodule indicates that the external calculation resource needs to be invoked, generating, by the VXUC module, a clock pulse signal corresponding to the external calculation resource, and sending control information included in the decoded instruction information and the clock pulse signal to the VXUD module; sending, by the VXUD module, the clock pulse signal and the control information to the external calculation resource, to enable the external calculation resource to perform data calculation according to the clock pulse signal and the control information; and receiving, by the VXUD module, a data calculation result from the external calculation resource.

With reference to the third aspect, in an implementation manner of the third aspect, the control information includes configuration flag information, and the sending, by the VXUD module, the clock pulse signal and the control information to the external calculation resource, to enable the external calculation resource to perform data calculation according to the clock pulse signal and the control information includes: sending, by the VXUD module, the configuration flag information to the external calculation resource, so that the external calculation resource is configured according to the configuration flag information and then performs the data calculation.

With reference to the third aspect and the foregoing implementation manner of the third aspect, in another implementation manner of the third aspect, the method further includes: receiving, by the VXUD module, an immediate obtained after the VIF initially decodes the instruction, and sending the immediate to the external calculation resource, so that the external calculation resource uses the immediate to perform the data calculation; or receiving, by the VXUD module, register address information obtained after the VIF initially decodes the instruction, reading register data from a register according to the register address information, and sending the register data to the external calculation resource, so that the external calculation resource uses the register data to perform the data calculation.

With reference to the third aspect and the foregoing implementation manner of the third aspect, in another implementation manner of the third aspect, the method further includes: receiving, by the VXUD module, register read/write token information obtained after the VIF initially decodes the instruction, and performing a read/write operation on the register according to the register read/write token information by using the read/write interface; and receiving, by the VXUC module, the register read/write token information obtained after the VIF initially decodes the instruction, and managing transfer of a read/write token of the register according to the register read/write token information.

With reference to the third aspect and the foregoing implementation manner of the third aspect, in another implementation manner of the third aspect, the method further includes: exchanging, by the VXUD module with another VXUD module, information about the data calculation result of the external calculation resource; and performing, by the VXUD module, a shift operation and/or a selection operation according to the data calculation result received by the VXUD module and the information that is about the data calculation result and obtained from the another VXUD module.

With reference to the third aspect and the foregoing implementation manners of the third aspect, in another implementation manner of the third aspect, when the decoded instruction information obtained by the decoding submodule indicates that the external calculation resource needs to be invoked, the generating, by the VXUC module, a clock pulse signal corresponding to the external calculation resource and control information, and sending the clock pulse signal and the control information to the VXUD module includes: when multiple pieces of decoded instruction information indicate that a same external calculation resource needs to be invoked, sequentially generating, by the VXUC module, clock pulse signals for the multiple pieces of decoded instruction information, and sending the generated clock pulse signals to the VXUD module in a sequential order.

With reference to the third aspect and the foregoing implementation manners of the third aspect, in another implementation manner of the third aspect, when the decoded instruction information obtained by the decoding submodule indicates that the external calculation resource needs to be invoked, the generating, by the VXUC module, a clock pulse signal corresponding to the external calculation resource and control information, and sending the clock pulse signal and the control information to the VXUD module includes: when one piece of decoded instruction information indicates that multiple external calculation resources need to be invoked, sequentially generating, by the VXUC module, clock pulse signals for the multiple external calculation resources, and sequentially sending the generated clock pulse signals to the VXUD module according to an order of invoking the multiple external calculation resources.

The asynchronous instruction execution apparatus in the embodiments of the present invention is divided into two parts: a VXUC and a VXUD. A quantity of VXUDs is set according to a data bit width. Therefore, a data cable of each VXUD may be separately laid out, a bus may also be separately laid out, and a backend layout becomes more convenient.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
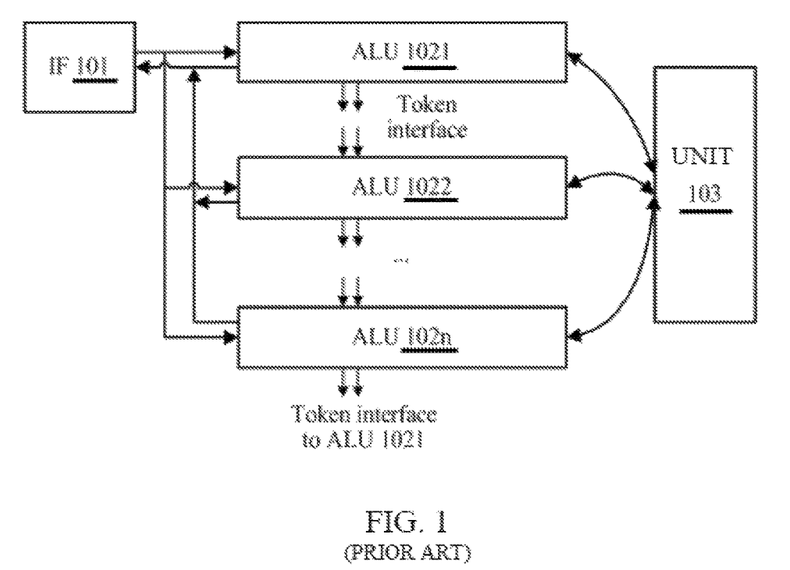
FIG. 1 is a schematic block diagram of an existing token-based asynchronous processor architecture.

FIG. 1 is a schematic block diagram of an existing token-based asynchronous processor architecture. The asynchronous processor architecture includes an instruction fetch (IF, instruction fetch) unit 101 and n ALUs (marked as an ALU 1021, an ALU 1022, . . . , and an ALU 102$n$ respectively, and marked as an ALU 102 in the following if there is no need to distinguish one ALU from another). Each XU corresponds to an ALU. The asynchronous processor architecture may further include another unit 103. The unit 103 may include a resource or a function such as a REG, a MAC, and an EXU. The IF unit 101 has a first-in first-out (FIFO, First In First Out) trigger for storing an instruction, and several instructions are stored.

When an instruction fetch token (may also be referred to as an instruction token) for an ALU 102 arrives, the ALU 102 fetches an instruction from the IF unit 101, and then the instruction fetch token continues to be transferred along. In any ALU 102, a launch token (launch token) usually refers to a decoding token for an instruction, a write operation token of a register marks the end, and then the launch token starts again. This transfer may be referred to as horizontal token transfer. Between ALUs 102, a same token is transferred from an ALU 102 to a next ALU 102 and finally returns. For example, a launch token of the ALU 1021 is transferred to a launch token of the ALU 102n, and then returns to the ALU 1021. Another token is transferred in a same manner, and this transfer may be referred to as vertical token transfer.

In the asynchronous processor based on the architecture in FIG. 1, a quantity of ALUs is equal to a quantity of XUs, the tokens and the ALUs are bound together, and ALU adjustment becomes inconvenient. In addition, when a data bit width is relatively large, a backend layout becomes relatively difficult.

Figure 2:
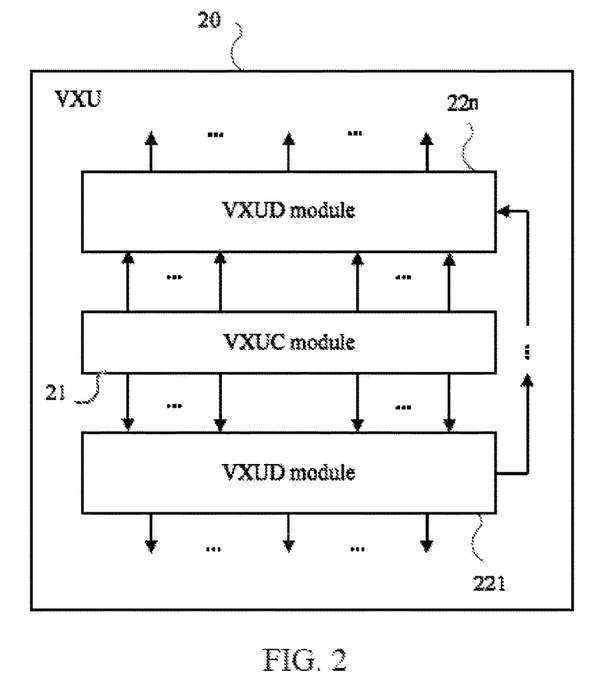
FIG. 2 is a schematic block diagram of an asynchronous instruction execution apparatus according to an embodiment of the present invention.

FIG. 2 is a schematic block diagram of an asynchronous instruction execution apparatus according to an embodiment of the present invention. An implementation form of an asynchronous instruction execution apparatus 20 in FIG. 2 is an asynchronous processor, which may also be referred to as a vector execution unit (VXU, Vector Execution Unit) in the specification of the present invention.

The asynchronous instruction execution apparatus 20 includes a vector execution unit control (VXUC, Vector Execution Unit Control) module 21 and n vector execution unit data (VXUD, Vector Execution Unit Data) modules 221-22n. The VXUD modules may be referred to as a VXUD module 22 if there is no need to distinguish one VXUD module from another.

A quantity n of VXUD modules 22 is a positive integer. A bit width of data processed by the asynchronous instruction execution apparatus 20 is M, a bit width of each VXUD module 22 is N, and n=M/N.

The VXUC module 21 is configured to perform instruction decoding and token management.

The n VXUD modules 22 are cascaded, separately connected to the VXUC module 21, and configured to invoke an external calculation resource to perform data calculation.

The asynchronous instruction execution apparatus in this embodiment of the present invention is divided into two parts: a VXUC and a VXUD. A quantity of VXUDs is set according to a data bit width. Therefore, a data cable of each VXUD may be separately laid out, a bus may also be separately laid out, and a backend layout becomes more convenient.

The cascaded VXUD modules 22 indicate that the VXUD modules 22 are sequentially connected one by one. For example, the VXUD module 221 is connected to the VXUD module 222, the VXUD module 222 is connected to the VXUD module 223, and so on. Optionally, the last VXUD module 22n may be connected to the VXUD module 221.

In addition, most data calculation is completed by a calculation resource outside the VXU, so that the quantity of VXUs does not need to be equal to a quantity of calculation resources. The external calculation resource may include an ALU, a MAC, a lookup table (LUT, Lookup Table), an EXU, and the like. In this design, the calculation resource, such as an ALU, is located outside the VXU. Different from FIG. 1, the quantity of calculation resources does not need to remain consistent with a quantity of tokens, and may be flexibly increased or decreased according to a chip requirement, so as to improve resource utilization. In this embodiment of the present invention, these external calculation resources may also be referred to as vector (Vector) calculation resources, such as a VALU, a VMAC, a VLUT, and a VEXU.

Specifically, in the VXU architecture in this embodiment of the present invention, a quantity of VXUDs is set according to a data bit width. Therefore, the VXUDs may be separated according to a high-order or low-order bit. A data bit width of M=128 bits is used as an example. If a bit width of each VXUD is N=32 bits, n=M/N=4 VXUDs may be designed in the VXU. That is, the data bit width of 128 bits is divided into four narrow bit widths of 32 bits according to a high-order or low-order bit, and the four narrow bit widths are calculated and scheduled by four VXUDs respectively. VXUDs may communicate with each other to transmit information such as data carry, so as to obtain a final result.

Figure 3:
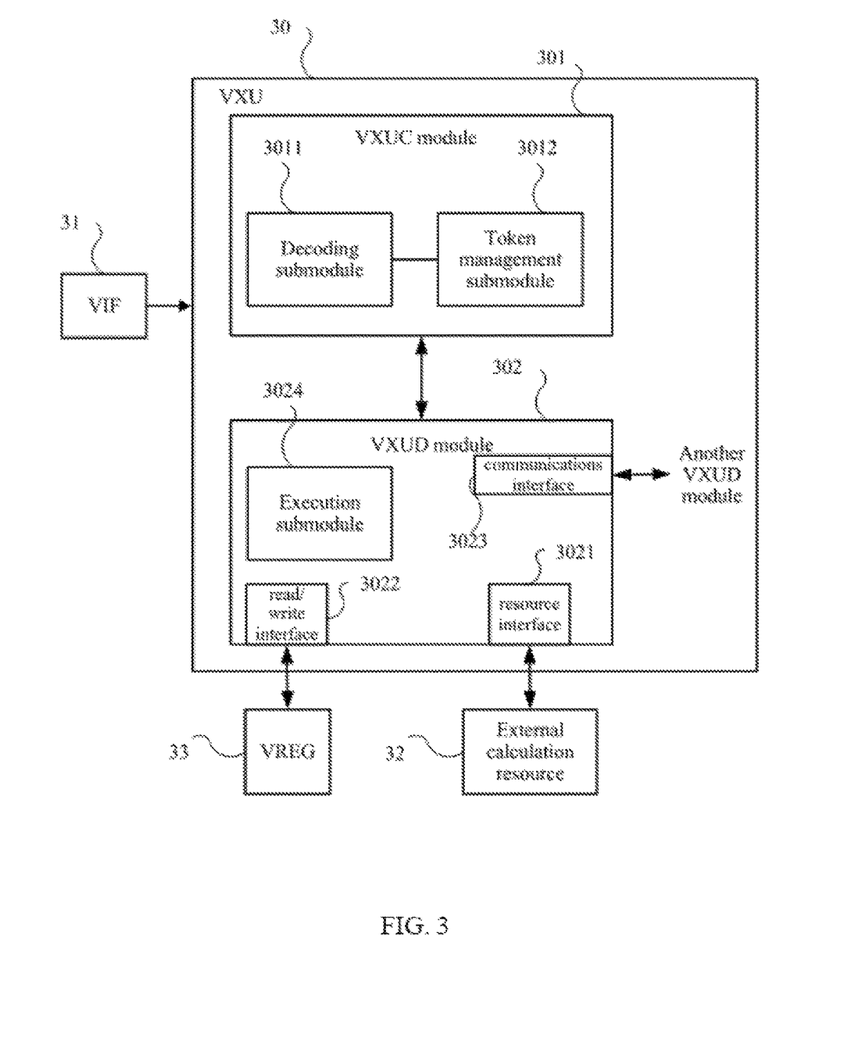
FIG. 3 is a schematic block diagram of an asynchronous instruction execution apparatus according to another embodiment of the present invention.

FIG. 3 is a schematic block diagram of an asynchronous instruction execution apparatus according to another embodiment of the present invention. An asynchronous instruction execution apparatus VXU 30 in FIG. 3 is a specific example for the asynchronous instruction execution apparatus 20 in FIG. 2, and includes a VXUC module 301 and a VXUD module 302. For brevity, FIG. 3 illustrates only one VXUD module 302, but a quantity of VXUD modules is not limited in this embodiment of the present invention. The VXU 30 may work separately, or work cooperatively with another VXU.

FIG. 3 also illustrates an instruction fetcher 31 connected to the VXU 30. In this embodiment of the present invention, the instruction fetcher 31 may also be referred to as a vector instruction fetcher (VIF, Vector Instruction Fetch).

In addition, FIG. 3 also illustrates an external calculation resource 32 connected to the VXU 30. As described above, the external calculation resource 32 may include a VALU, a VMAC, a VLUT, a VEXU, and the like.

As shown in FIG. 3, the VXUC module 301 may include a decoding submodule 3011 and a token management submodule 3012.

The decoding submodule 3011 is configured to decode an instruction from the VIF 31, to obtain decoded instruction information. The token management submodule 3012 is configured to manage, according to the decoded instruction information obtained by the decoding submodule 3011, token transfer between the VXU 30 and another VXU and token transfer inside the VXU 30.

Therefore, tokens of each VXU may be managed by the VXUC, and design is more clear and modular. In an optional embodiment, the token management submodule 3012 may include a series of physical units, and each physical unit is responsible for transferring a type of token. For example, tokens managed by the token management submodule 3012 may include: a decoding token, an instruction fetch token, a register read token, a register write token, a calculation resource token (that is, a token used to invoke an external calculation resource), a special register read/write token, a data load/store (LD/ST, Load/Store) token, and the like. Each type of token is managed by one physical unit, and physical units may be mutually connected to implement token transfer inside the VXU.

Optionally, in another embodiment, the token management submodule 3012 is further configured to: when the decoded instruction information obtained by the decoding submodule 3011 indicates that the external calculation resource 32 needs to be invoked, generate a clock pulse (clock pulse) signal corresponding to the external calculation resource 32, and send the clock pulse signal to the VXUD module 302. In addition, the decoded instruction information may include control information used to configure the external calculation resource 32. The VXUC module 301 may send the control information and the clock pulse signal together to the VXUD module 302.

For example, when the decoded instruction information needs a relatively complex multiplication, division, or floating-point operation, it may be determined that the instruction information indicates that the external calculation resource 32 needs to be invoked.

The VXUD module 302 may include a resource interface 3021 connected to the external calculation resource 32. The VXUD module 302 may send the clock pulse signal and the control information to the external calculation resource 32 by using the resource interface 3021, to enable the external calculation resource 32 to perform data calculation according to the clock pulse signal and the control information. The VXUD module 302 may further receive, by using the resource interface 3021, a data calculation result from the external calculation resource 32.

Therefore, the calculation resource, such as an ALU, is located outside the VXU. Different from FIG. 1, a quantity of calculation resources does not need to remain consistent with a quantity of tokens, and may be flexibly increased or decreased according to a chip requirement, so as to improve resource utilization.

Optionally, in an embodiment, the control information may be used to configure the external calculation resource 32. For example, the control information includes configuration flag (flag) information. The VXUD module 302 may send the configuration flag information to the external calculation resource 32 by using the resource interface 3021, so that the external calculation resource is configured according to the configuration flag information and then performs the data calculation. For example, if an external calculation resource ALU can support calculation of two bit widths: 16 bits and 32 bits, and the decoded instruction information obtained by the decoding submodule 3011 indicates that 16-bit calculation needs to be performed, the control information may instruct, by carrying an explicit indication field/bit or in an implicit manner, the external calculation resource ALU to perform the data calculation according to the 16-bit width, and after receiving the control information, the external calculation resource ALU performs the data calculation according to the 16-bit width.

Optionally, in another embodiment, the VIF 31 initially decodes the instruction, and may obtain an immediate or register address information. The VIF 31 may send, to the VXUD module 302, the immediate or the register address information that is obtained after initially decoding. The VXUD module 302 may send the immediate to the external calculation resource 32 by using the resource interface 3021, so that the external calculation resource 32 uses the immediate to perform the data calculation. Alternatively, the VXUD module 32 may read register data from a register according to the register address information (for example, read the register data stored in the register address from the register by using a read/write interface 3022), and then send the register data to the external calculation resource 32 by using the resource interface 3021, so that the external calculation resource 32 uses the register data to perform the data calculation.

Invoking a VLUT is used as an example. The VXUC generates a clock pulse signal, and sends the clock pulse signal to the VLUT by using the VXUD. After receiving the clock pulse signal, the VLUT samples input data to perform calculation. In addition, the VXUC generates control information, and sends the control information to the VLUT by using the VXUD. The control information is mainly used to configure a VLUT choice because the VLUT includes many scenarios that need to be managed by using the control information.

Optionally, in another embodiment, according to a requirement, the VXUD module 32 may also be capable of decoding to some extent, and may decode an instruction, and generate data-calculation-related control information (for example, the control information generated by the VXUD may also include some configuration flag information used to configure the external calculation resource 32). The VXUD module 32 sends the control information generated by the VXUD module 32 and the control information generated by the VXUC module 31 together to the external calculation resource, so as to configure the external calculation resource for the data calculation.

In this embodiment of the present invention, a register 33 used by the VXU may also be referred to as a vector register (VREG, Vector REG).

Optionally, in another embodiment, the VXUD module 302 may further include a read/write interface 3022 connected to the register.

The VXUD module 302 may receive register read/write token information obtained after the VIF 31 initially decodes the instruction, and perform a read/write operation on the register according to the register read/write token information by using the read/write interface.

The token management submodule 3012 may receive the register read/write token information obtained after the VIF 31 initially decodes the instruction, and manage transfer of a read/write token of the register according to the register read/write token information.

Optionally, in another embodiment, the VXUD module 302 may further include a communications interface 3023 and an execution submodule 3024.

The VXUD module 302 may exchange, with another VXUD module by using the communications interface 3023, information about the data calculation result of the external calculation resource 32.

The execution submodule 3024 is configured to perform a shift operation and/or a selection operation according to the data calculation result received by the VXUD module 302 and the information that is about the data calculation result and obtained from the another VXUD module.

For example, the information about the data calculation result may be carry information. Because multiple VXUD modules are separated according to a high-order or low-order bit, when calculation results of the external calculation resource 32 are separately obtained, carry processing probably needs to be performed on these calculation results. The VXUD module may perform such simple calculation. For example, the execution submodule 3024 may include a shifter, a selector, or the like for performing this simple calculation. Certainly, if necessary, this simple calculation may be implemented by the external calculation resource 32 in this embodiment of the present invention.

Optionally, in another embodiment, the VXUD module 301 may further receive delay information obtained after the VIF 31 initially decodes the instruction, and control a sampling delay of the external calculation resource 32 according to the delay information.

Optionally, in another embodiment, the VXUC module 301 may further receive instruction anomaly information obtained after the VIF 31 initially decodes the instruction. The token management submodule 3012 may manage token transfer according to the instruction anomaly information.

Optionally, in another specific embodiment, when multiple pieces of decoded instruction information indicate that a same external calculation resource needs to be invoked, the token management submodule 3012 may sequentially generate clock pulse signals for the multiple pieces of decoded instruction information, and send the generated clock pulse signals to the VXUD module 32 in a sequential order. For example, the token management submodule 3012 generates corresponding clock pulse information for each piece of instruction information. Therefore, multiple pieces of clock pulse information corresponding to the multiple pieces of instruction information are sequentially generated, and sequentially sent to the VXUD module 32. In this way, a calculation resource can be invoked without conflict.

Alternatively, when one piece of decoded instruction information indicates that multiple external calculation resources need to be invoked, the token management submodule 3012 may sequentially generate clock pulse signals for the multiple external calculation resources, and sequentially send the generated clock pulse signals to the VXUD module 32 according to an order of invoking the multiple external calculation resources. In this way, sequential execution of the calculation resources can be ensured, so as to ensure correct execution of operations.

It should be noticed that, in this embodiment of the present invention, when the VXUD module 302 receives information from the VIF 31, information may be transmitted by using a direct interface between the VXUD module 302 and the VIF 31, or the VXUC module 301 may forward related information. For example, first, the VIF 31 may send various information obtained by initially decoding the instruction to the VXUC module 301, and then the VXUC module 301 forwards information that needs to be sent to the VXUD module 302 to the VXUD module 302.

In the following, an example for invoking an external calculation resource by using a token in this embodiment of the present invention is described in detail with reference to a specific example.

Figure 4:
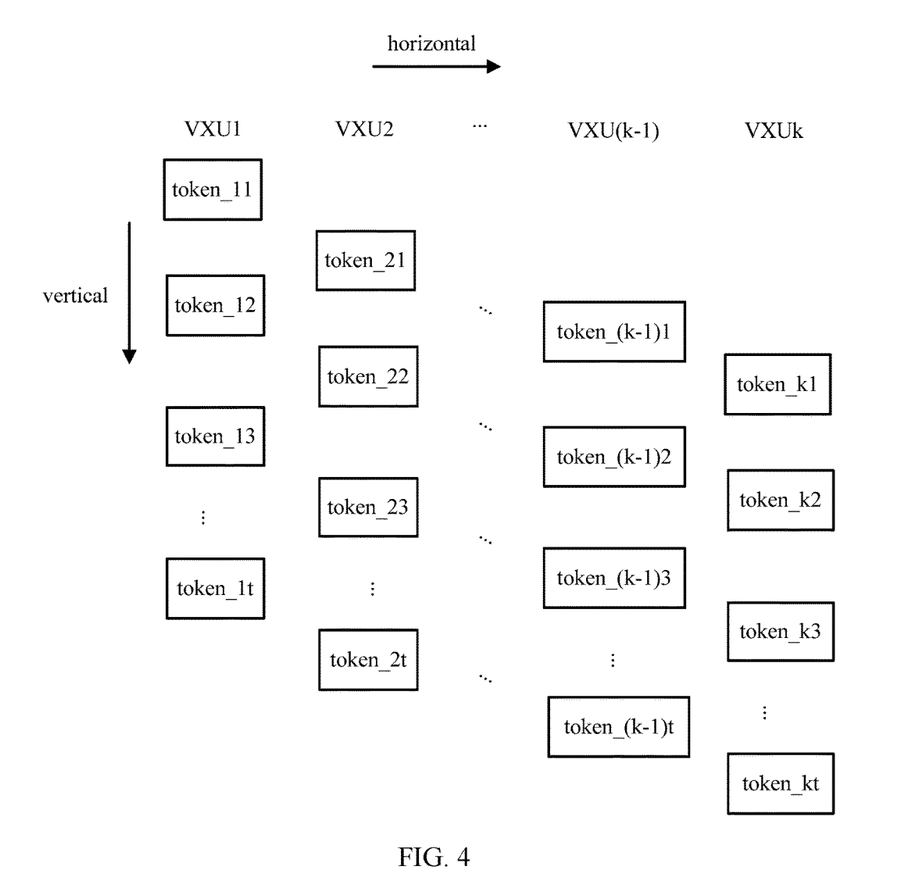
FIG. 4 is a schematic diagram of a token transfer process according to an embodiment of the present invention.

FIG. 4 is a schematic diagram of a token transfer process according to an embodiment of the present invention. In an example in FIG. 4, it is assumed that a processor has k VXUs in total, that is, a VXU1, a VXU2, ..., a VXUk, and t tokens (a token_i1, a token_i2, ..., a token_it) are transferred inside any VXUi (i=1, 2, ..., k). Token transfer between VXUs may be referred to as vertical token transfer, and token transfer inside a VXU may be referred to as horizontal token transfer. Token transfer is a circular operation. That is, when a token is horizontally or vertically transferred to a last location, the token returns to a first location.

As shown in FIG. 4, if a $j^{th}$ token token_ij (j=1, 2, ..., t) of a VXUi is complete, the token is vertically transferred to a $j^{th}$ token token_(i+1)j of a VXU(i+1), and at the same time, is horizontally transferred to a $(j+1)^{th}$ token token_i(j+1) of a VXUi.

In a specific example, it is assumed that the token_i1 is a launch token (such as a decoding token). When a token_11 of the VXU1 takes effect, the VXU1 performs a decoding operation. After execution is complete, the token is vertically transferred to a token_21 of the VXU2, and so on. After a token_k1 of the VXUk is out of use, the token returns to the token_11 of the VXU1.

In another specific example, it is assumed that a decoded instruction needs sequential execution of a register read operation, a calculation resource invoking operation, a register write operation for writing a calculation result of the calculation resource back to a register, and the like. In this process, a decoding token, a register read token, a calculation resource token, a register write token, and the like may be sequentially used. The decoding token is a token_i1, the register read token is a token_i2, ..., and the last register write token is a token_it. When the token_i1 of the VXUi takes effect, the VXUi performs a decoding operation. After execution is complete, the token is horizontally transferred to the token_i2 of the VXUi to perform the register read operation, and so on. After the register write operation of the token_it of the VXUi is complete, the token returns to the token_i1 of the VXUi.

In addition, an interface for vertically transfer a token between VXUs may be disposed on the VXUC. For example, VXUCs of adjacent VXUs pass a token by using such interfaces. Alternatively, the interface may be disposed on the VXUD. For example, VXUCs of adjacent VXUs pass a token by using interfaces of their respective VXUDs. Alternatively, the interface may be disposed independently of the VXUC and the VXUD. For example, VXUCs of adjacent VXUs pass a token by using interfaces of the VXUs. A manner for vertically transfer a token is not limited in this embodiment of the present invention.

Figure 5:
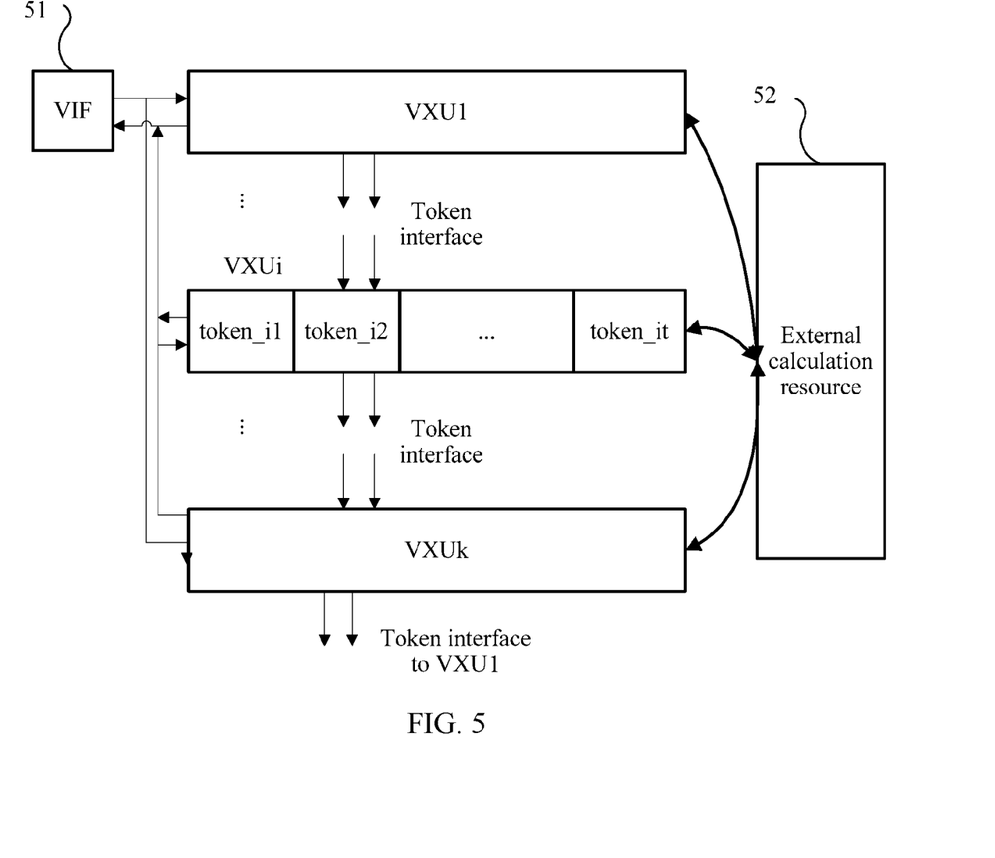
FIG. 5 is a schematic diagram of a resource invoking process according to an embodiment of the present invention.

FIG. 5 is a schematic diagram of a resource invoking process according to an embodiment of the present invention. In an example in FIG. 5, it is assumed that k VXUs (a VXU1, a VXU2, ..., a VXUk, and k>1) in a processor need to invoke a same external calculation resource 52. This invoking cannot conflict with each other, and is implemented by using token transfer.

A VIF 51 functions as an existing IF, provides an FIFO for an instruction, and may initially decode the instruction to obtain decoding information. The decoding information may include delay information, register read/write token information, instruction anomaly information, and the like. The VIF 51 may send the decoding information to an appropriate module according to content of the decoding information. For example, the delay information may be sent to a VXUD module, the instruction anomaly information may be sent to a VXUC module, and the register read/write token information may be sent to both the VXUC module and the VXUD module.

Multiple VXUs invoke a same calculation resource by using the following working method:

(1) When a VXUi receives a calculation resource token from a VXU(i−1), the VXUi holds (hold) the calculation resource token.

(2) When an instruction for the VXUi has a corresponding calculation resource request, the calculation resource token continues to be used. If there is no corresponding calculation resource request, the calculation resource token is directly transparently transmitted to a VXU(i+1).

(3) When the instruction has the calculation resource request, according to decoded instruction information and a current calculation resource token, a VXUC generates control information and a clock pulse signal, and sends the control information and the clock pulse signal to a VXUD.

(4) The VXUD invokes the calculation resource according to the clock pulse signal and the control information.

After the calculation resource completes calculation, a calculation result is returned to the VXUD.

(5) If the VXUD needs to perform simple processing, such as carry processing, on the calculation result, the VXUD exchanges carry information with another VXUD, and performs the carry processing on the calculation result to obtain a final result. Invoking the calculation resource is complete. In another optional manner, that invoking the calculation resource is complete may be determined after the foregoing process (4) ends. Afterwards, the calculation resource token is transferred to the VXU(i+1).

Therefore, by using the foregoing manner, when multiple VXUs need to invoke a same external calculation resource, invoking a resource without conflict is ensured by using token transfer.

Figure 6:
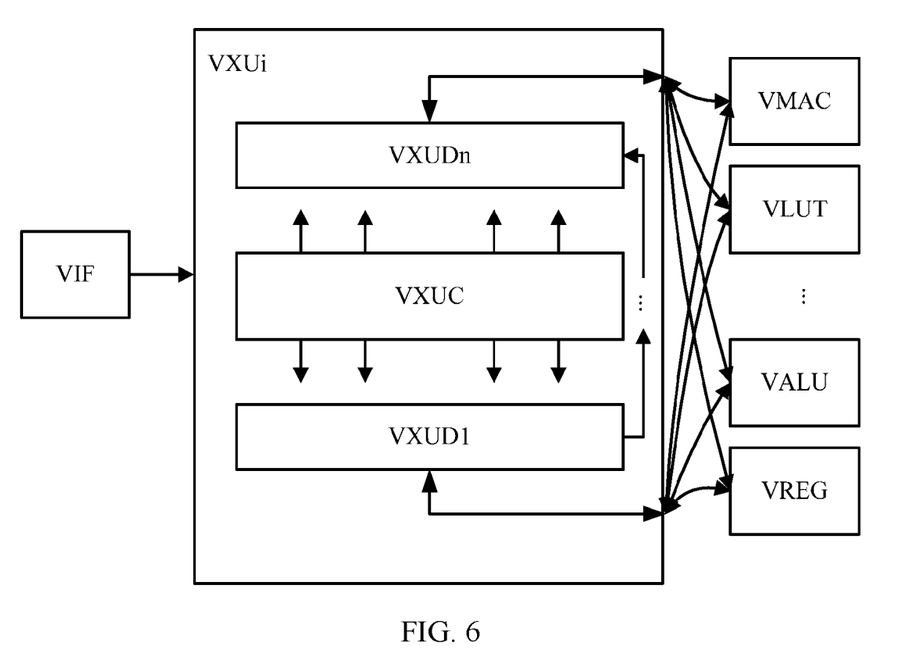
FIG. 6 is a schematic diagram of a resource invoking process according to an embodiment of the present invention.

FIG. 6 is a schematic diagram of a resource invoking process according to an embodiment of the present invention. In an example in FIG. 6, it is assumed that a VXUi needs to invoke multiple external calculation resources, such as a VMAC, a VLUT, a VALU, and the like, and further needs to invoke a register VREG. Likewise, token transfer may be used to correctly invoke a calculation resource, so as to ensure correct execution of an instruction.

A VXU may perform multiple instructions. When the instructions arrive at the VXU, according to decoded instruction information and corresponding tokens, the VXU generates clock pulse signals and corresponding control information, and invokes corresponding external calculation resources. When a same instruction invokes multiple modules, a token is used to ensure a normal procedure.

A single VXU invokes different resources by using the following working method:

(1) When receiving a launch token (such as a decoding token), the VXUi reads and decodes an instruction.

(2) Valid tokens that need to be used are determined according to a decoding result and a token transferred from a VXU(i−1).

(3) A VXUC generates a clock pulse signal and control information, and sends the clock pulse signal and the control information to a VXUD. The VXUD invokes each external calculation resource according to the clock pulse signal and the control information (may also coordinate with control information generated by decoding by the VXUD itself).

(4) When multiple decoded instructions obtained by the VXUC invoke different modules respectively, the VXUC generates corresponding clock pulse signals and control information, and sends the corresponding clock pulse signals and control information to the VXUD.

(5) When a single instruction invokes multiple modules, a token inside the VXUC ensures execution of the modules in a sequential order.

Therefore, when one piece of decoded instruction information indicates that multiple external calculation resources need to be invoked, clock pulse signals for the multiple external calculation resources may be sequentially generated, and the generated clock pulse signals are sequentially sent to the VXUD module according to an order of invoking the multiple external calculation resources, so that correct execution of operations is ensured by using token transfer.

The asynchronous instruction execution apparatus in the embodiments of the present invention may be implemented in a terminal, such as a part of hardware modules of a CPU of the terminal. However, a specific implementation form of the asynchronous instruction execution apparatus is not limited in the embodiments of the present invention.

Figure 7:
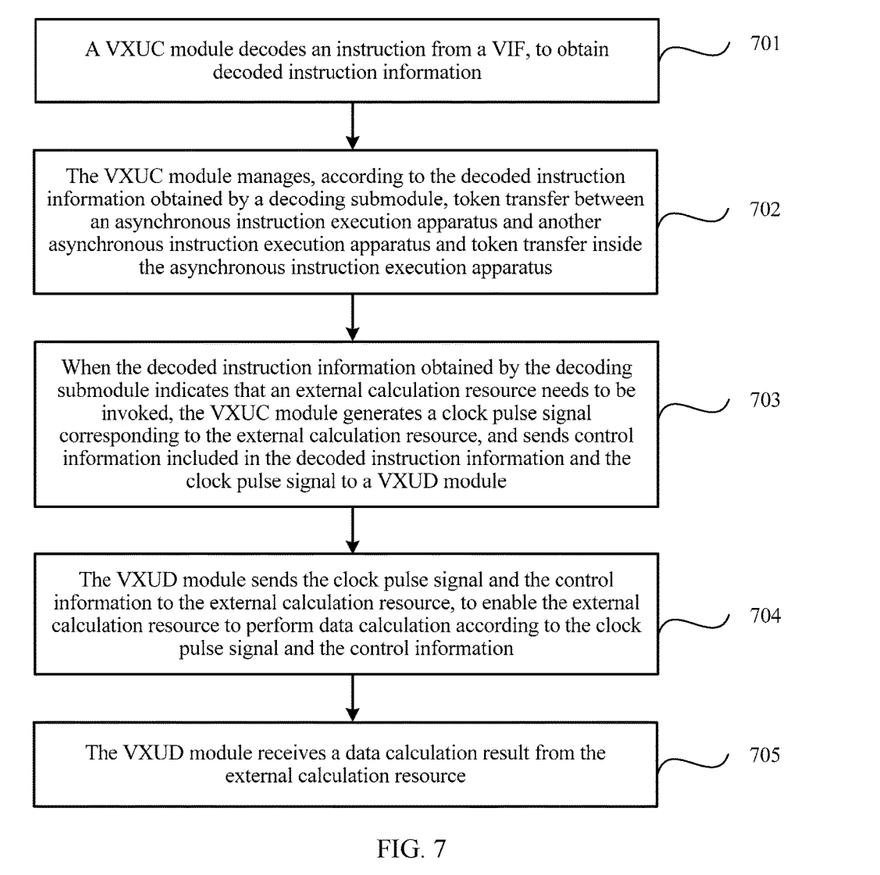
FIG. 7 is a flowchart of an asynchronous instruction execution method according to an embodiment of the present invention.

FIG. 7 is a flowchart of an asynchronous instruction execution method according to an embodiment of the present invention. The method in FIG. 7 may be performed by an asynchronous instruction execution apparatus (such as the VXUs shown in FIG. 2 to FIG. 6). The asynchronous instruction execution apparatus VXU may include a VXUC module and n VXUD modules, and n is a positive integer. The n VXUD modules are cascaded, and separately connected to the VXUC module. A bit width of data processed by the asynchronous instruction execution apparatus is M, a bit width of each VXUD module is N, and n=M/N.

701. The VXUC module decodes an instruction from a VIF, to obtain decoded instruction information.

702. The VXUC module manages, according to the decoded instruction information obtained by a decoding submodule, token transfer between the asynchronous instruction execution apparatus and another asynchronous instruction execution apparatus and token transfer inside the asynchronous instruction execution apparatus.

703. When the decoded instruction information obtained by the decoding submodule indicates that an external calculation resource needs to be invoked, the VXUC module generates a clock pulse signal corresponding to the external calculation resource, and sends control information included in the decoded instruction information and the clock pulse signal to the VXUD module.

704. The VXUD module sends the clock pulse signal and the control information to the external calculation resource, to enable the external calculation resource to perform data calculation according to the clock pulse signal and the control information.

705. The VXUD module receives a data calculation result from the external calculation resource.

The asynchronous instruction execution apparatus in this embodiment of the present invention is divided into two parts: a VXUC and a VXUD. A quantity of VXUDs is set according to a data bit width. Therefore, a data cable of each VXUD may be separately laid out, a bus may also be separately laid out, and a backend layout becomes more convenient.

Each step of the method in this embodiment of the present invention may correspond to each process performed in the foregoing apparatus embodiment. To avoid repetition, details are not described again.

Optionally, in an embodiment, the control information may include configuration flag information. In step 704, the VXUD module may send the configuration flag information to the external calculation resource, so that the external calculation resource is configured according to the configuration flag information and then performs the data calculation.

Optionally, in another embodiment, the VXUD module may receive an immediate obtained after the VIF initially decodes the instruction, and send the immediate to the external calculation resource, so that the external calculation resource uses the immediate to perform the data calculation. Alternatively, the VXUD module may receive register address information obtained after the VIF initially decodes the instruction, read register data from a register according to the register address information, and send the register data to the external calculation resource, so that the external calculation resource uses the register data to perform the data calculation.

Optionally, in another embodiment, the VXUD module may further receive register read/write token information obtained after the VIF initially decodes the instruction, and perform a read/write operation on the register according to the register read/write token information by using a read/write interface.

Optionally, in another embodiment, the VXUD module may further receive register read/write token information obtained after the VIF initially decodes the instruction, and manage transfer a read/write token of the register according to the register read/write token information.

Optionally, in another embodiment, the VXUD module may further exchange, with another VXUD module, information (such as carry information) about the data calculation result of the external calculation resource, and then the VXUD module may perform a shift operation and/or a selection operation according to the data calculation result received by the VXUD module and the information that is about the data calculation result and obtained from the another VXUD module.

Optionally, in another embodiment, in step 702, when multiple pieces of decoded instruction information indicate that a same external calculation resource needs to be invoked, the VXUC module may sequentially generate clock pulse signals for the multiple pieces of decoded instruction information, and send the generated clock pulse signals to the VXUD module in a sequential order.

Optionally, in another embodiment, in step 702, when one piece of decoded instruction information indicates that multiple external calculation resources need to be invoked, the VXUC module may sequentially generate clock pulse signals for the multiple external calculation resources, and sequentially send the generated clock pulse signals to the VXUD module according to an order of invoking the multiple external calculation resources.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An asynchronous instruction execution apparatus, comprising:
    a vector execution unit control (VXUC) module and n vector execution unit data (VXUD) modules, wherein n is a positive integer;
    wherein the VXUC module is configured to perform instruction decoding and token management;
    wherein the n VXUD modules are cascaded, separately connected to the VXUC module, and configured to invoke an external calculation resource to perform a data calculation; and
    wherein a bit width of data processed by the asynchronous instruction execution apparatus is M, and a bit width of each VXUD module is N, wherein n=M/N.

2. The asynchronous instruction execution apparatus according to claim 1, wherein the VXUC is configured to decode an instruction from a vector instruction fetcher (VIF), to obtain decoded instruction information; and
    the VXUC module is configured to manage, according to the decoded instruction information, token transfer between the asynchronous instruction execution apparatus and another asynchronous instruction execution apparatus, and token transfer inside the asynchronous instruction execution apparatus.

3. The asynchronous instruction execution apparatus according to claim 2, wherein:
    the VXUC module is further configured to: when the decoded instruction information indicates that the external calculation resource needs to be invoked, generate a clock pulse signal corresponding to the external calculation resource;
    the VXUC module is further configured to send control information comprised in the decoded instruction information and the clock pulse signal to a first VXUD module of the n VXUD modules; and the first VXUD module comprises a resource interface connected to the external calculation resource and is configured to send the clock pulse signal and the control information to the external calculation resource using the resource interface, to enable the external calculation resource to perform the data calculation according to the clock pulse signal and the control information, and is configured to receive, using the resource interface, a data calculation result from the external calculation resource.

4. The asynchronous instruction execution apparatus according to claim 3, wherein the control information comprises configuration flag information; and the first VXUD module is configured to send the configuration flag information to the external calculation resource using the resource interface, to enable the external calculation resource to be configured according to the configuration flag information and to perform the data calculation.

5. The asynchronous instruction execution apparatus according to claim 4, wherein:

the first VXUD module is further configured to receive an immediate obtained after the VIF processes the instruction, and send the immediate to the external calculation resource using the resource interface, to enable the external calculation resource to use the immediate to perform the data calculation; or the first VXUD module is further configured to receive register address information obtained after the VIF processes the instruction, read register data from a register according to the register address information, and send the register data to the external calculation resource using the resource interface, to enable the external calculation resource to use the register data to perform the data calculation.

6. The asynchronous instruction execution apparatus according to claim 5, wherein the first VXUD module further comprises a read/write interface connected to the register.

7. The asynchronous instruction execution apparatus according to claim 6, wherein:

the first VXUD module is further configured to receive register read/write token information obtained after the VIF processes the instruction, and perform a read/write operation on the register according to the register read/write token information using the read/write interface; and the VXUC module is further configured to receive the register read/write token information obtained after the VIF processes the instruction, and manage transfer of a read/write token of the register according to the register read/write token information.

8. The asynchronous instruction execution apparatus according to claim 5, wherein the first VXUD module further comprises a communications interface and an execution submodule;

the first VXUD module is configured to exchange, with another VXUD module of the n VXUD modules using the communications interface, information about the data calculation result of the external calculation resource; and the execution submodule is configured to perform a shift operation and/or a selection operation according to the data calculation result received by the first VXUD module and the information that is about the data calculation result and obtained from the another VXUD module.

9. The asynchronous instruction execution apparatus according to claim 5, wherein:

the first VXUD module is further configured to receive delay information obtained after the VIF processes the instruction, and control a sampling delay of the external calculation resource according to the delay information.

10. The asynchronous instruction execution apparatus according to claim 2, wherein:

the VXUC module is further configured to receive instruction anomaly information obtained after the VIF processes the instruction; and the VXUC module is further configured to manage token transfer according to the instruction anomaly information.

11. The asynchronous instruction execution apparatus according to claim 3, wherein:

the VXUC module is configured to: when multiple pieces of decoded instruction information indicate that a same external calculation resource needs to be invoked, sequentially generate clock pulse signals for the multiple pieces of decoded instruction information, and send the generated clock pulse signals to the first VXUD module in a sequential order; or the VXUC module is configured to: when one piece of decoded instruction information indicates that multiple external calculation resources need to be invoked, sequentially generate clock pulse signals for the multiple external calculation resources, and sequentially send the generated clock pulse signals for the multiple external calculation resources to the first VXUD module according to an order of invoking the multiple external calculation resources.

12. A terminal, comprising the asynchronous instruction execution apparatus according to claim 1.

13. An asynchronous instruction execution method, wherein the method is executed by an asynchronous instruction execution apparatus, the asynchronous instruction execution apparatus comprises a vector execution unit control (VXUC) module and n vector execution unit data (VXUD) modules, n is a positive integer, the n VXUD modules are cascaded and separately connected to the VXUC module, a bit width of data processed by the asynchronous instruction execution apparatus is M, a bit width of each VXUD module is N, n=M/N, and the method comprises:

decoding, by the VXUC module, an instruction from a vector instruction fetcher (VIF), to obtain decoded instruction information;

managing, by the VXUC module according to the decoded instruction information obtained by a decoding submodule, token transfer between the asynchronous instruction execution apparatus and another asynchronous instruction execution apparatus and token transfer inside the asynchronous instruction execution apparatus;

when the decoded instruction information obtained by the decoding submodule indicates that an external calculation resource needs to be invoked, generating, by the VXUC module, a clock pulse signal corresponding to the external calculation resource, and sending control information comprised in the decoded instruction information and the clock pulse signal to a first VXUD module of the n VXUD modules;

sending, by the first VXUD module, the clock pulse signal and the control information to the external calculation resource, to enable the external calculation resource to perform a data calculation according to the clock pulse signal and the control information; and receiving, by the first VXUD module, a data calculation result from the external calculation resource.

14. The method according to claim 13, wherein the control information comprises configuration flag information; and the sending, by the first VXUD module, the clock pulse signal and the control information to the external calculation resource, to enable the external calculation resource to perform the data calculation according to the clock pulse signal and the control information comprises:

sending, by the first VXUD module, the configuration flag information to the external calculation resource, to enable the external calculation resource to be configured according to the configuration flag information and to perform the data calculation.

15. The method according to claim 14, further comprising:

receiving, by the first VXUD module, an immediate obtained after the VIF processes the instruction, and sending the immediate to the external calculation resource, to enable the external calculation resource to use the immediate to perform the data calculation; or receiving, by the first VXUD module, register address information obtained after the VIF processes the instruction, reading register data from a register according to the register address information, and sending the register data to the external calculation resource, to enable the external calculation resource to use the register data to perform the data calculation.

16. The method according to claim 14, further comprising:

receiving, by the first VXUD module, register read/write token information obtained after the VIF processes the instruction, and performing a read/write operation on a register according to the register read/write token information using a read/write interface; and receiving, by the VXUC module, the register read/write token information obtained after the VIF processes the instruction, and managing transfer of a read/write token of the register according to the register read/write token information.

17. The method according to claim 14, further comprising:

exchanging, by the first VXUD module with another VXUD module of the n VXUD modules, information about the data calculation result of the external calculation resource; and performing, by the first VXUD module, a shift operation and/or a selection operation according to the data calculation result received by the first VXUD module and the information that is about the data calculation result and obtained from the another VXUD module.

18. The method according to claim 13, wherein when the decoded instruction information obtained by the decoding submodule indicates that the external calculation resource needs to be invoked, the generating, by the VXUC module, a clock pulse signal corresponding to the external calculation resource and control information, and sending the clock pulse signal and the control information to the first VXUD module comprises:

when multiple pieces of decoded instruction information indicate that a same external calculation resource needs to be invoked, sequentially generating, by the VXUC module, clock pulse signals for the multiple pieces of decoded instruction information, and sending the generated clock pulse signals to the first VXUD module in a sequential order.

19. The method according to claim 13, wherein when the decoded instruction information obtained by the decoding submodule indicates that the external calculation resource needs to be invoked, the generating, by the VXUC module, a clock pulse signal corresponding to the external calculation resource and control information, and sending the clock pulse signal and the control information to the first VXUD module comprises:

when one piece of decoded instruction information indicates that multiple external calculation resources need to be invoked, sequentially generating, by the VXUC module, clock pulse signals for the multiple external calculation resources, and sequentially sending the generated clock pulse signals for the multiple external calculation resources to the first VXUD module according to an order of invoking the multiple external calculation resources.

* * * * *